(12) United States Patent
Dong et al.

(10) Patent No.: US 11,467,634 B2
(45) Date of Patent: Oct. 11, 2022

(54) DISPLAY MODULE AND TELEVISION

(71) Applicant: SHENZHEN TCL NEW TECHNOLOGY CO., LTD., Guangdong (CN)

(72) Inventors: Xiaoxu Dong, Guangdong (CN); Wei Hua, Guangdong (CN); Linfeng Wang, Guangdong (CN)

(73) Assignee: Shenzhen TCL New Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/251,214

(22) PCT Filed: Dec. 23, 2019

(86) PCT No.: PCT/CN2019/127414
§ 371 (c)(1),
(2) Date: Dec. 11, 2020

(87) PCT Pub. No.: WO2020/135330
PCT Pub. Date: Jul. 2, 2020

(65) Prior Publication Data
US 2021/0263571 A1    Aug. 26, 2021

(30) Foreign Application Priority Data

Dec. 28, 2018 (CN) .......................... 201811632054.4

(51) Int. Cl.
*G06F 1/18* (2006.01)
*H04N 5/64* (2006.01)
*G02F 1/1333* (2006.01)

(52) U.S. Cl.
CPC .............. *G06F 1/181* (2013.01); *H04N 5/64* (2013.01); *G02F 1/133308* (2013.01)

(58) Field of Classification Search
CPC ......... G06F 1/181; G06F 1/1601; H04N 5/64; H04N 21/4122; G02F 1/133314;
(Continued)

(56) References Cited

U.S. PATENT DOCUMENTS 10,310,330 B2    6/2019  Liu
2015/0301266 A1*  10/2015  Araki ................ G02B 6/005
                                                    362/606
(Continued)

FOREIGN PATENT DOCUMENTS

EP        1032202 A2 *  8/2000   ............... H04N 5/64
WO     2018166034 A1    9/2018

OTHER PUBLICATIONS

Extended European Search Report dated Feb. 10, 2022 From European Patent Office Re. Application No. EP19905511.2.

*Primary Examiner* — Michael C Zarroli
(74) *Attorney, Agent, or Firm* — Nathan & Associates; Menachem Nathan (57) ABSTRACT

Disclosed are a display module and a television, the display module including: a back plate including a back plate body and a side wall, the back plate body and the side wall being integrally formed and together defining a mounting space, a connecting rib parallel to the back plate body being integrally formed on an inside surface of the side wall; a display screen, an edge of an inside surface of the display screen being fixed to the connecting rib; and an optical film set mounted in the mounting space.

18 Claims, 4 Drawing Sheets

(58) Field of Classification Search
CPC ......... G02F 1/133317; G02F 1/133606; G02F 1/133608
See application file for complete search history.

(56) References Cited

U.S. PATENT DOCUMENTS

2016/0062034 A1\* 3/2016 Hirayama .............. G02B 6/005
  349/65
2016/0187567 A1   6/2016 Zhou
2019/0212489 A1\* 7/2019 Xu ....................... G02B 6/0088

\* cited by examiner

DISPLAY MODULE AND TELEVISION

CROSS-REFERENCE TO RELATED APPLICATIONS

This application is the National Stage of International Application No. PCT/CN2019/127414, filed on Dec. 23, 2019, which claims priority to Chinese Application No. 201811632054.4, filed on Dec. 28, 2018, entitled "DISPLAY MODULE AND TELEVISION", the entire disclosure of which is incorporated herein by reference.

TECHNICAL FIELD

The present disclosure relates to the field of display devices, and in particular to a display module and a television.

BACKGROUND

Nowadays, in common display devices (such as televisions, computer monitors, etc.), the display module usually includes a back plate, a middle frame, a front frame, a display screen, and an optical film set. The back plate, the middle frame and the front frame together contain the display screen and the optical film set. Obviously, a common display device has many parts, assembly steps are complicated, and the assembly of product is really inconvenient.

SUMMARY

The main objective of the present disclosure is to provide a display module, which aims to improve the ease of assembly of the product.

In order to achieve the above objective, the display module provided by the present disclosure includes:

a back plate including a back plate body and a side wall, the back plate body and the side wall being integrally formed and together defining a mounting space, a connecting rib parallel to the back plate body being integrally formed on an inside surface of the side wall;

a display screen, an edge of an inside surface of the display screen being fixed to the connecting rib; and an optical film set mounted in the mounting space.

In an embodiment, the back plate body, the side wall and the connecting rib are integrally injection molded or integrally die-casted; and/or the back plate body, the side wall and the connecting rib are integrally injection molded through thermal conductive plastic; or the back plate body, the side wall and the connecting rib are integrally injection molded through ordinary plastic, and the back plate is provided with a cooling fin or a semiconductor chilling fin.

In an embodiment, the edge of the inside surface of the display screen is adhered to an outer surface of the connecting rib; or a fixing buckle is integrally formed on the outer surface of the connecting rib to restrict the display screen from being separated from the connecting rib; and/or the edge of the inside surface of the display screen is adhered to the connecting rib through adhesive glue, a glue storage groove is integrally formed on the outer surface of the connecting rib, and the glue storage groove is filled with the adhesive glue; and/or a width of a cross section of the glue storage groove gradually increases in a depth direction.

In an embodiment, a free end surface of the side wall is higher than or flush with an outer surface of the display screen; or an outer surface of the connecting rib is flush with a free end surface of the side wall, and the display screen is flush with or higher than an outer surface of the side wall.

In an embodiment, the optical film set includes a first film adjacent to an inner side of the display screen, and an edge of the first film is provided with a side protrusion; and the connecting rib is provided with a mounting sink communicating with the mounting space, and the side protrusion is clamped into the mounting sink.

In an embodiment, a depth of the mounting sink is not less than a thickness of the side protrusion.

In an embodiment, a hanging hole is provided on the side protrusion, a hanging protrusion is provided on the mounting sink, and the hanging hole is hooked with the hanging protrusion; or the side protrusion is adhered to the mounting sink; and/or an area of the mounting sink is greater than an area of the side protrusion; and/or the hanging hole is larger than the hanging protrusion.

In an embodiment, the optical film set includes a light guide plate provided on an inner side of the display screen, a positioning member is provided on an inner side of the side wall, the positioning member is located between the connecting rib and the back plate body, and an side edge of the light guide plate is abutted against the positioning member.

In an embodiment, a portion of the inside surface of the side wall located inside the connecting rib is located more outside than a portion of the inside surface of the side wall located outside the connecting rib.

In an embodiment, the positioning member is mounted on the inside surface of the side wall; or the positioning member is mounted on an inside surface of the back plate body, and the positioning member is adjacent to the side wall; and/or the positioning member is adhered to or detachably mounted on the back plate.

In an embodiment, the positioning member includes a first positioning block attached to the inside surface of the side wall, and a second positioning block formed by bending and extending from a side of the first positioning block close to the back plate body; and a free end of the second positioning block is abutted against the side edge of the light guide plate.

In an embodiment, a free end of the connecting rib is provided with a positioning notch at a position corresponding to the positioning member; and/or the positioning member is configured as an elastic positioning member; and/or the positioning member is configured as a rubber member or a silicone member; and/or the positioning member is configured as a white rubber member.

The present disclosure further provides a television, including the display module as described above.

In technical solutions of the present disclosure, the inside surface of the side wall of the back plate is integrally formed with the connecting rib for directly connecting the edge of the inside surface of the display screen. In this way, parts such as the middle frame and the front frame can be reduced, thereby reducing the assembly steps of the display module, making the assembly of the display module more convenient, and saving labor costs. On the other hand, it also reduces materials and saves material costs, and there is no need to consider the size fit between the back plate and the middle frame and the front frame during the development and preparation of the back plate, which makes the product development and preparation easier, and as long as the dimensional accuracy of the back plate meets the requirements, the product quality can be guaranteed.

BRIEF DESCRIPTION OF THE DRAWINGS

In order to more clearly illustrate the embodiments of the present disclosure, drawings used in the embodiments will be briefly described below. Obviously, the drawings in the following description are only some embodiments of the present disclosure. It will be apparent to those skilled in the art that other figures can be obtained according to the structures shown in the drawings without creative work.

The realization of the objective, functional characteristics, and advantages of the present disclosure are further described with reference to the accompanying drawings.

DETAILED DESCRIPTION OF THE EMBODIMENTS

The technical solutions of the embodiments of the present disclosure will be described in more detail below with reference to the accompanying drawings. It is obvious that the embodiments to be described are only some rather than all of the embodiments of the present disclosure. All other embodiments obtained by persons skilled in the art based on the embodiments of the present disclosure without creative efforts shall fall within the scope of the present disclosure.

It should be noted that if there is a directional indication (such as up, down, left, right, front, rear . . . ) in the embodiments of the present disclosure, the directional indication is only used to explain the relative positional relationship, movement, etc. of the components in a certain posture (as shown in the drawings). If the specific posture changes, the directional indication will change accordingly.

It should be noted that, the descriptions associated with, e.g., "first" and "second," in the present disclosure are merely for descriptive purposes, and cannot be understood as indicating or suggesting relative importance or impliedly indicating the number of the indicated technical feature. Therefore, the feature associated with "first" or "second" can expressly or impliedly include at least one such feature. Besides, the meaning of "and/or" appearing in the disclosure includes three parallel scenarios. For example, "A and/or B" includes only A, or only B, or both A and B. In addition, the technical solutions between the various embodiments can be combined with each other, but they must be based on the realization of those of ordinary skill in the art. When the combination of technical solutions is contradictory or cannot be achieved, it should be considered that such a combination of technical solutions does not exist, nor is it within the scope of the present disclosure.

The present disclosure provides a display module, which can be applied to display devices such as computer monitors and televisions.

Figure 1:
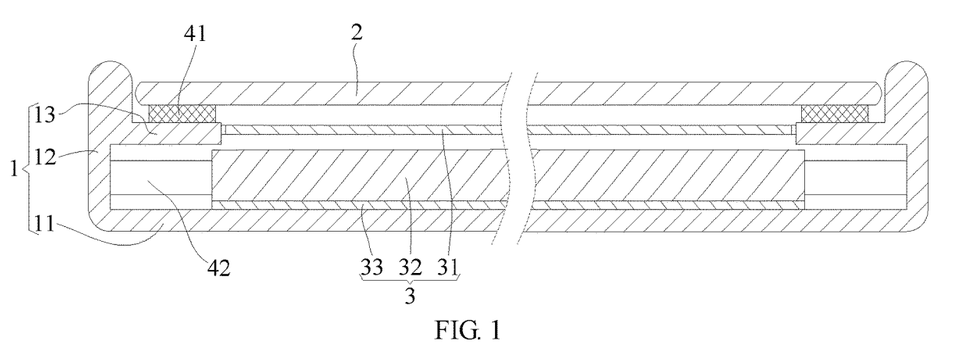
FIG. 1 is a schematic cross-sectional structural view of a display module according to an embodiment of the present disclosure.

As shown in FIG. 1, in an embodiment of the present disclosure, the display module includes:

a back plate 1 including a back plate body 11 and a side wall 12, the back plate body 11 and the side wall 12 being integrally formed and together defining a mounting space, a connecting rib 13 parallel to the back plate body 11 being integrally formed on an inside surface of the side wall 12; it can be understood that the connecting rib 13 is higher than the inside surface of the side wall 12, and is generally parallel to the back plate body 11, and the connecting rib 13 can also be slightly inclined to the back plate body 11;

a display screen 2, an edge of an inside surface of the display screen 2 being fixed to the connecting rib 13; and an optical film set 3 mounted in the mounting space.

It can be understood that, in this embodiment, the back plate body 11 is parallel to the display screen 2 (generally, the display screen 2 is parallel to the back plate body 11, and the display screen 2 can also be slightly inclined to the back plate body 11). The side wall 12 is bent relative to the back plate body 11, and the optical film set 3 is located between the display screen 2 and the back plate body 11.

Without loss of generality, in this embodiment, the display screen 2 is a liquid crystal screen. In this embodiment, the back plate body 11, the side wall 12 and the connecting rib 13 are integrally injection molded. That is to say, the back plate 1 is configured as an injection molded part to facilitate batch preparation of the back plate 1. In addition, thermal conductive plastics can be used for the injection molding material to facilitate the heat dissipation of the display module. Ordinary plastics can also be used for the injection molding material. In this case, a cooling fin can be added to the back plate 1 to improve heat dissipation efficiency, or a semiconductor chilling fin can be added to cool down the back plate 1. However, the design is not limited to this, in other embodiments, the back plate body 11, the side wall 12 and the connecting rib 13 can also be integrally die-casted. That is, the back plate 1 is configured as a casting, which can also facilitate the batch preparation of the back plate 1. In addition, the casting material usually has good heat dissipation efficiency, which is beneficial to the heat dissipation of the display module.

In this embodiment, the back plate body 11 is generally quadrilateral. A plurality of side walls 12 are provided, and the plurality of side walls 12 generally include a left side wall, a right side wall and a top side wall. A bottom of the back plate body 11 is empty, on the one hand, it is used to mount the backlight strip, and on the other hand, a core-pulling opening can be formed at the bottom of the back plate body 11, so that the connecting rib 13 can be easily formed by core-pulling. Of course, in other embodiments, the core-pulling opening used to form the connecting rib 13 by core-pulling can also be an opening surrounded by the free sides of the connecting rib 13 of each of the plurality of side walls 12. In this case, the core-pulling slider needs to retract into the opening, and then leave the mounting space in a direction away from the back plate body 11 to complete the core-pulling.

In technical solutions of the present disclosure, the inside surface of the side wall 12 of the back plate 1 is integrally formed with the connecting rib 13 for directly connecting the edge of the inside surface of the display screen 2. In this way, parts such as the middle frame and the front frame can be reduced, thereby reducing the assembly steps of the display module, making the assembly of the display module more convenient, and saving labor costs. On the other hand, it also reduces materials and saves material costs, and there is no need to consider the size fit between the back plate 1 and the middle frame and the front frame during the development and preparation of the back plate 1, which makes the product development and preparation easier, and as long as the dimensional accuracy of the back plate 1 meets the requirements, the product quality can be guaranteed.

In this embodiment, further, a free end of the side wall 13 is higher than the connecting rib 13, therefore the free end of the side wall 12 can also provide collision protection for the side of the display screen 2, thereby reducing the probability of the break of the display screen 2 due to collisions of the side of the display screen 2. In this embodiment, a free end surface of the side wall 12 is higher than an outer surface of the display screen 2. Compared with the technical solution in which the free end surface of the side wall 12 is lower than the outer surface of the display screen 2, in the present technical solution, the free end of the side wall 12 can completely wrap the side of the display screen 2 so as to prevent the side of the display screen 2 from being impacted, thereby providing more effective collision protection for the side of the display screen 2. In other embodiments, the free end surface of the side wall 12 may be flush with the outer surface of the display screen 2, therefore the free end of the side wall 12 can also completely cover the side of the display screen 2. It should be noted that, in this embodiment, the free end of the side wall 12 refers to an end of the side wall 12 away from the back plate body 11, and the free end surface of the side wall 12 refers to the end surface of the side wall 12 away from the back plate body 11 and away from the back plate body 11.

It should be noted that, in other embodiments of the present disclosure, the outer surface of the connecting rib 13 may also be flush with the free end surface of the side wall 12. In this case, the display screen 2 is flush with the outer surface of the side wall 12, such that when viewing the display module from the front perspective, the side wall 12 of the back plate 1 is completely invisible, and only the display screen 2 can be seen, thereby realizing a full screen in a strict sense and improving user experience. In some other embodiments, in order to realize a full screen, the display screen 2 may also be higher than the outer surface of the side wall 12.

In this embodiment, further, the edge of the inside surface of the display screen 2 is adhered to an outer surface of the connecting rib 13. Generally, Double-sided glue 41, adhesive glue, etc. may be used to achieve the bonding between the display screen 2 and the connecting rib 13. The fixing manner of bonding is simple, however, this design is not limited to this. In other embodiments, a fixing buckle may be integrally formed on the outer surface of the connecting rib 13, and the fixing buckle restricts the display screen 2 from being separated from the connecting rib 13. In this embodiment, a glue storage groove (not shown) is integrally formed on the outer surface of the connecting rib 13 to increase the use amount and bonding area of the adhesive glue when bonding with adhesive glue, so as to improve the bonding reliability between the display screen 2 and the connecting rib 13. Further, a width of a cross section of the glue storage groove gradually increases in a depth direction. For example, the cross section has a dovetail shape. In this way, after the adhesive glue in the glue storage groove is cured and shaped, a wedge-shaped connection structure is formed between the adhesive glue and the glue storage groove, which can improve the connection strength between the adhesive glue and the display screen 2 and make the fixing of the display screen 2 more reliable.

Figure 2:
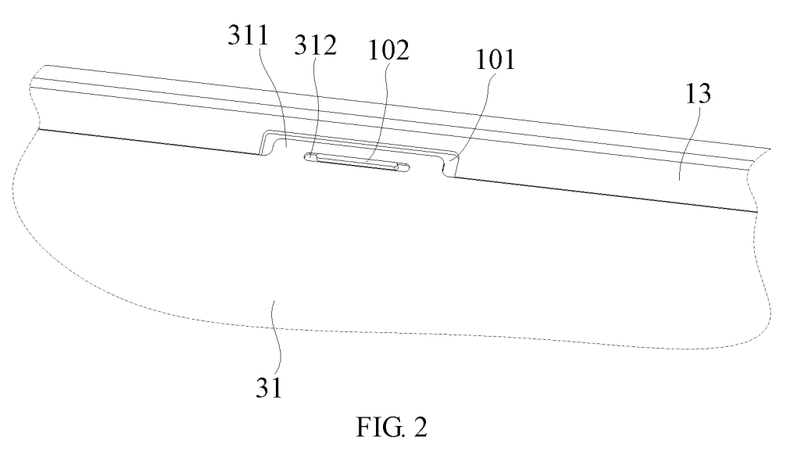
FIG. 2 is a schematic view of a part of the display module in FIG. 1; the display screen is hidden.
Figure 3:
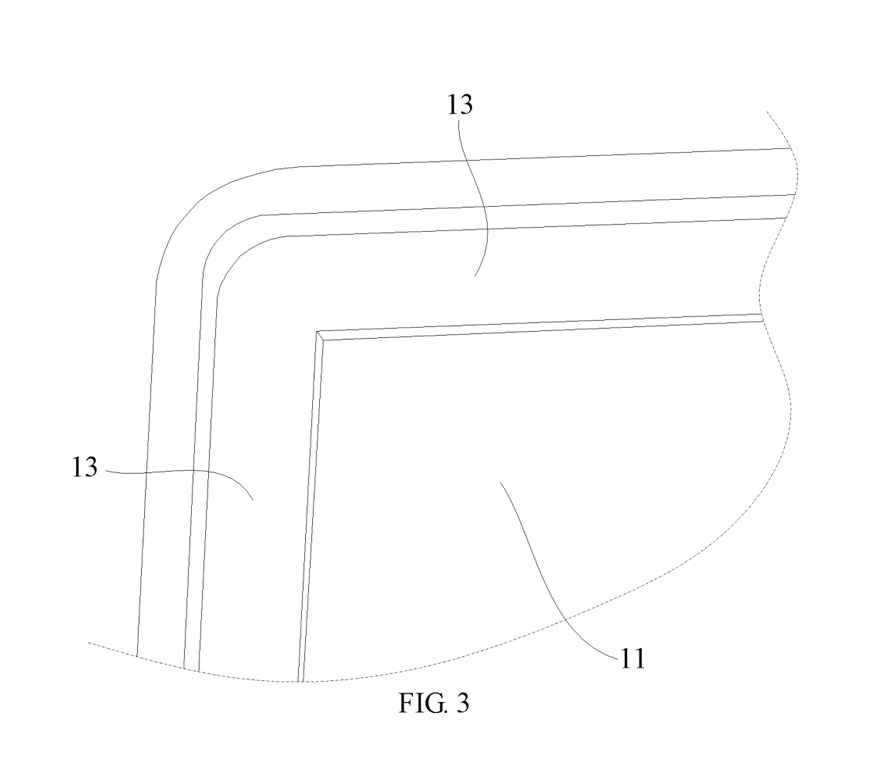
FIG. 3 is a schematic structural view of a corner of the display module in FIG. 1; the display screen and an optical film set are hidden.

As shown in FIG. 2, in this embodiment, further, the optical film set 3 includes a first film 31 adjacent to an inner side of the display screen 2, and an edge of the first film 31 is provided with a side protrusion 311; and the outer surface of the connecting rib 13 is provided with a mounting sink 101 communicating with the mounting space, and the side protrusion 311 of the first film 31 is clamped into the mounting sink 101 to provide positioning and certain support for the first film 31. It can be understood that the mounting sink 101 is recessed relative to the outer surface of the connecting rib 13, and penetrates the end surface of the end of the connecting rib 13 away from the side wall 12 to communicate with the mounting space, and the side protrusion 311 can be inserted into the mounting sink 101 through the penetrating position. In this embodiment, the mounting sink 101 is usually provided on the connecting rib 13 of the top side wall. Without loss of generality, the first film 31 may be a brightness enhancement film, a diffusion film, or the like. As shown in FIG. 3, in this embodiment, the connecting ribs 13 of each of the two adjacent side walls 12 transition smoothly at the corner of the back plate 1 without welding, which saves the process. It should be noted that, on the inner side of the first film 31, the optical film set 3 may further include a second film, a third film, etc. having other optical properties.

In this embodiment, generally, a depth of the mounting sink 101 on the connecting rib 13 is not less than a thickness of the side protrusion 311 to avoid the side protrusion 311 hindering the installation between the edge of the inside surface of the display screen 2 and the connecting rib 13. In some special cases, the thickness of the side protrusion 311 can also be allowed to be slightly larger than the depth of the mounting sink 101, as long as the thickness of the side protrusion 311 is not greater than the sum of the depth of the mounting sink 101 and the thickness of the adhesive layer (double-sided glue 41 or adhesive glue).

In this embodiment, further, a hanging hole 312 is provided on the side protrusion 311, and a hanging protrusion 102 is provided on the mounting sink 101. The side protrusion 311 is hooked with the hanging protrusion 102 of the mounting member through the hooking hole 312, to conveniently mount the first film 31 on the connecting rib 13. However, this design is not limited to this, in other embodiments, the side projection 311 of the first film 31 may also be bonded to the mounting sink 101 of the mounting member 10. In an embodiment, an area of the mounting sink 101 on the connecting rib 13 is greater than an area of the side protrusion 311 on the first film 21 to facilitate assembly. Similarly, the hanging hole 312 on the side protrusion 311 is larger than the hanging protrusion 102 on the mounting sink 101.

It should be noted that, in this embodiment, the mounting sink 101 and the hanging protrusion 102 can be integrally formed when forming the back plate body 11 and the side wall 12 (that is to say, when the back plate body 11 and the side wall 12 are formed by injection or casting, the mounting sink 101 and the hanging protrusion 102 are formed at the same time). The mounting sink 101 and the hanging protrusion 102 can be integrally formed by milling groove technique on the outer surface of the connecting rib 13 after forming the back plate body 11 and the side wall 12. That is to say, after the back plate body 11 and the side wall 12 are formed by injection or casting, the mounting sink 101 and the hanging protrusion 102 are further milled and processed.

As shown in FIG. 1, in this embodiment, the optical film set 3 further includes a light guide plate 32 provided on the inner side of the display screen 2, a positioning member 42 is provided on an inner side of the side wall 12, the positioning member 42 is located between the connecting rib 13 and the back plate body 11, and an side edge of the light guide plate 32 is abutted against the positioning member 42 to facilitate the positioning and installation of the light guide plate 32. Without loss of generality, the first film 31 is located between the light guide plate 32 and the display screen 2. Generally, in order to improve the backlight efficiency, the optical film set 3 further includes a reflective sheet 33 between the light guide plate 32 and the back plate body 11. In this embodiment, generally, the inner sides of the left side wall, the right side wall and the top side wall are all provided with positioning members 42 to position the light guide plate 32 and avoid the shaking of the light guide plate 32. However, this design is not limited to this. In other embodiments, the positioning member 42 can also be provided at two corners away from the bottom edge of the back plate body 11.

In this embodiment, the positioning member 42 is mounted on the inside surface of the side wall 12. However, this design is not limited to this. In other embodiments, the positioning member 42 can also be mounted on the inside surface of the back plate body 11. Generally, the positioning member 42 will be adjacent to the side wall 12 at this time.

In this embodiment, further, a portion of the inside surface of the side wall 12 located inside the connecting rib 13 is located more outside than a portion of the inside surface of the side wall 12 located outside the connecting rib 13, such that more space is provided on the side of the connecting rib 13 close to the back plate body 11 to facilitate the installation of the positioning member 42. In this embodiment, generally, the outer side surface of the side wall 12 is arranged in a plane, so that the thickness of the part of the side wall 12 located inside the connecting rib 13 is smaller than the thickness of the part located outside the connecting rib 13.

In this embodiment, the positioning member 42 is adhered to the back plate 1. However, this design is not limited to this. In other embodiments, the positioning member 42 can also be detachably mounted on the back plate 1 (for example, but not limited to a tight fitting and embedding manner), so as to facilitate the replacement of the positioning member 42.

In this embodiment, further, the positioning member 42 includes a first positioning block attached to the inside surface of the side wall 12, and a second positioning block formed by bending and extending from a side of the first positioning block close to the back plate body 11; and a free end of the second positioning block is abutted against the side edge of the light guide plate 32. It can be understood that the first positioning block can provide the positioning member 42 with a larger area connected to the inside surface of the side wall 12, thereby making the installation of the positioning member 42 on the side wall 12 more stable.

Figure 4:
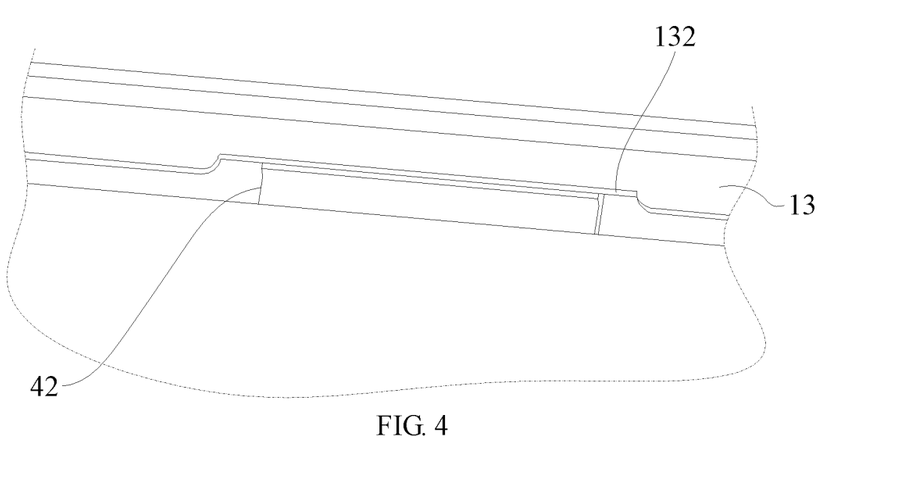
FIG. 4 is a schematic structural view of another part of the display module in FIG. 1; the display screen is hidden.

Besides, as shown in FIG. 4, in this embodiment, a free end of the connecting rib 13 is provided with a positioning notch 132 at a position corresponding to the positioning member 42 to facilitate the fitting and installation of the positioning member 42 and the side wall 12, and it is also beneficial to indicate an installation position of the positioning member 42.

Further, in this embodiment, the positioning member 42 is configured as an elastic positioning member, that is to say, the positioning member 42 has elasticity, so as to avoid the phenomenon that the light guide plate 32 and the positioning member are difficult to match due to component tolerances. In an embodiment, the positioning member 42 may be configured as a rubber member, a silicone member, or the like. In addition, in order to prevent the positioning member 42 from absorbing light and affecting the backlight effect, the positioning member 42 can be a white rubber member.

The present disclosure also provides a television including a display module, and the specific structure of the display module refers to the above-mentioned embodiment. Since this television adopts all the technical solutions of all the foregoing embodiments, it has at least all the beneficial effects brought about by the technical solutions of the foregoing embodiments, which will not be repeated here.

The above are only some embodiments of the present disclosure, and do not limit the scope of the present disclosure thereto. Under the inventive concept of the present disclosure, equivalent structural transformations made according to the description and drawings of the present disclosure, or direct/indirect application in other related technical fields are included in the scope of the present disclosure.

What is claimed is:

1. A display module, comprising:
a back plate comprising a back plate body and a side wall, the back plate body and the side wall being integrally formed and together defining a mounting space, a connecting rib parallel to the back plate body being integrally formed on an inside surface of the side wall;
a display screen, an edge of an inside surface of the display screen being fixed to the connecting rib;
an optical film set mounted in the mounting space;
wherein the optical film set comprises a first film adjacent to an inner side of the display screen, and an edge of the first film is provided with a side protrusion; and
the connecting rib is provided with a mounting sink communicating with the mounting space, and the side protrusion is clamped into the mounting sink.

2. The display module of claim 1, wherein:
the back plate body, the side wall and the connecting rib are integrally injection molded or integrally die-casted; or
the back plate body, the side wall and the connecting rib are integrally injection molded through thermal conductive plastic; or
the back plate body, the side wall and the connecting rib are integrally injection molded through ordinary plastic, and the back plate is provided with a cooling fin or a semiconductor chilling fin.

3. The display module of claim 1, wherein:
the edge of the inside surface of the display screen is adhered to an outer surface of the connecting rib.

4. The display module of claim 1, wherein:
a free end surface of the side wall is higher than or flush with an outer surface of the display screen.

5. The display module of claim 1, wherein a depth of the mounting sink is not less than a thickness of the side protrusion.

6. The display module of claim 1, wherein:
a hanging hole is provided on the side protrusion, a hanging protrusion is provided on the mounting sink, and the hanging hole is hooked with the hanging protrusion; or
the side protrusion is adhered to the mounting sink; or
an area of the mounting sink is greater than an area of the side protrusion; or
the hanging hole is larger than the hanging protrusion.

7. A display module, comprising:
a back plate comprising a back plate body and a side wall, the back plate body and the side wall being integrally formed and together defining a mounting space, a connecting rib parallel to the back plate body being integrally formed on an inside surface of the side wall;

a display screen, an edge of an inside surface of the display screen being fixed to the connecting rib;

an optical film set mounted in the mounting space; and wherein the optical film set comprises a light guide plate provided on an inner side of the display screen, a positioning member is provided on an inner side of the side wall, the positioning member is located between the connecting rib and the back plate body, and an side edge of the light guide plate is abutted against the positioning member.

8. The display module of claim 7, wherein a portion of the inside surface of the side wall located inside the connecting rib is located more outside than a portion of the inside surface of the side wall located outside the connecting rib.

9. The display module of claim 7, wherein:

the positioning member is mounted on the inside surface of the side wall; or the positioning member is mounted on an inside surface of the back plate body, and the positioning member is adjacent to the side wall; or the positioning member is adhered to or detachably mounted on the back plate.

10. The display module of claim 7, wherein:

the positioning member comprises a first positioning block attached to the inside surface of the side wall, and a second positioning block formed by bending and extending from a side of the first positioning block close to the back plate body; and a free end of the second positioning block is abutted against the side edge of the light guide plate.

11. The display module of claim 7, wherein:

a free end of the connecting rib is provided with a positioning notch at a position corresponding to the positioning member; or the positioning member is configured as an elastic positioning member; or the positioning member is configured as a rubber member or a silicone member; or the positioning member is configured as a white rubber member.

12. A television, comprising a display module, the display module comprising:

a back plate comprising a back plate body and a side wall, the back plate body and the side wall being integrally formed and together defining a mounting space, a connecting rib parallel to the back plate body being integrally formed on an inside surface of the side wall;

a display screen, an edge of an inside surface of the display screen being fixed to the connecting rib;

an optical film set mounted in the mounting space;

wherein the optical film set comprises a first film adjacent to an inner side of the display screen, and an edge of the first film is provided with a side protrusion; and the connecting rib is provided with a mounting sink communicating with the mounting space, and the side protrusion is clamped into the mounting sink.

13. The television of claim 12, wherein:

the back plate body, the side wall and the connecting rib are integrally injection molded or integrally die-casted; or the back plate body, the side wall and the connecting rib are integrally injection molded through thermal conductive plastic; or the back plate body, the side wall and the connecting rib are integrally injection molded through ordinary plastic, and the back plate is provided with a cooling fin or a semiconductor chilling fin.

14. The television of claim 12, wherein:

the edge of the inside surface of the display screen is adhered to an outer surface of the connecting rib.

15. The television of claim 12, wherein:

a free end surface of the side wall is higher than or flush with an outer surface of the display screen.

16. The television of claim 12, wherein:

a hanging hole is provided on the side protrusion, a hanging protrusion is provided on the mounting sink, and the hanging hole is hooked with the hanging protrusion; or the side protrusion is adhered to the mounting sink; or an area of the mounting sink is greater than an area of the side protrusion; or the hanging hole is larger than the hanging protrusion.

17. The television claim 12, wherein the optical film set comprises a light guide plate provided on the inner side of the display screen, a positioning member is provided on an inner side of the side wall, the positioning member is located between the connecting rib and the back plate body, and an side edge of the light guide plate is abutted against the positioning member.

18. The television of claim 17, wherein:

a free end of the connecting rib is provided with a positioning notch at a position corresponding to the positioning member; or the positioning member is configured as an elastic positioning member; or the positioning member is configured as a rubber member or a silicone member; or the positioning member is configured as a white rubber member.

* * * * *